United States Patent [19]

Iimori et al.

[11] Patent Number: 5,065,184
[45] Date of Patent: Nov. 12, 1991

[54] LIGHT AMOUNT CONTROL APPARATUS

[75] Inventors: Akiro Iimori; Hiroshi Matsumoto, both of Yokohama; Fumito Ide, Zama, all of Japan

[73] Assignee: Kabushiki Kaisha Toshiba, Kawasaki, Japan

[21] Appl. No.: 373,037

[22] Filed: Jun. 29, 1989

[30] Foreign Application Priority Data

Jun. 30, 1988 [JP] Japan .................. 63-163984

[51] Int. Cl.$^5$ ............... G03G 15/04; G03B 27/72; G03B 27/80
[52] U.S. Cl. ................... 355/208; 355/228; 355/68; 355/69
[58] Field of Search ............ 355/208, 214, 228, 229, 355/68, 69, 243, 55-57; 315/158, 307; 323/241

[56] References Cited

U.S. PATENT DOCUMENTS

| | | | |
|---|---|---|---|
| 4,573,787 | 3/1986 | Sanbayashi et al. | 355/214 |
| 4,636,063 | 1/1987 | Takai et al. | 355/68 |
| 4,661,765 | 4/1987 | Bando et al. | 323/241 |
| 4,699,502 | 10/1987 | Araki et al. | 355/214 |
| 4,702,590 | 10/1987 | Usami | 355/214 |
| 4,855,648 | 8/1989 | Yagasaki | 355/68 X |
| 4,902,936 | 2/1990 | Yamada | 315/158 |
| 4,910,554 | 3/1990 | Noda | 355/208 |

FOREIGN PATENT DOCUMENTS 3303450 8/1983 Fed. Rep. of Germany .
3425572 1/1985 Fed. Rep. of Germany .
3517915 11/1985 Fed. Rep. of Germany .

Primary Examiner—Joan H. Pendegrass
Attorney, Agent, or Firm—Foley & Lardner

[57] ABSTRACT

A light amount control apparatus contains an exposure lamp, a photo sensor for receiving light from the lamp, an AC power source for applying an AC voltage to the lamp, a CPU for computing an electric power to be supplied to the exposure lamp in accordance with magnifications and optical densities of originals by using the data signal outputted from the photo sensor, a lamp regulator for control an electric power supplied to the exposure lamp by using a value computed by the CPU, and a zero-cross generator for causing the CPU to periodically perform the computation in synchronism with the AC voltage of AC power source applied to the lamp.

2 Claims, 8 Drawing Sheets

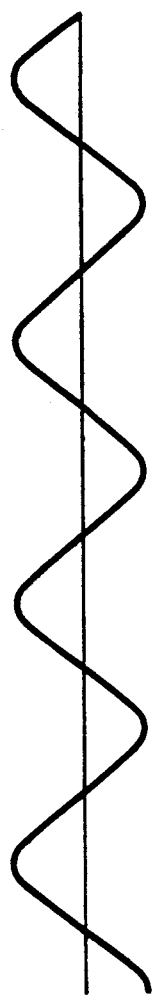
FIG. 3A  AC INPUT
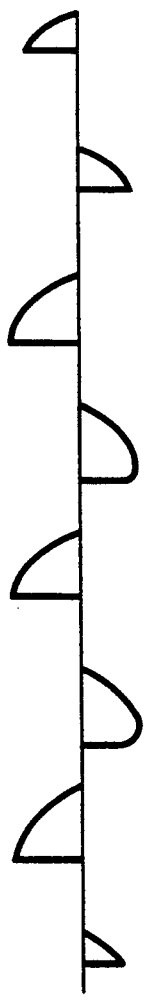
FIG. 3B  VOLTAGE APPLIED TO LAMP
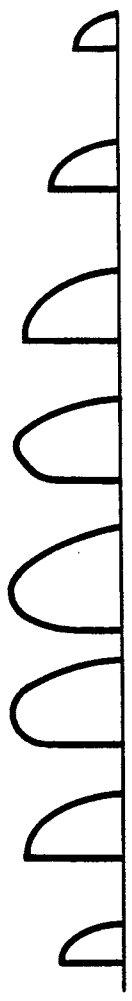
FIG. 3C  LAMP TURN-ON POWER
FIG. 3D  LIGHT OUTPUT FROM LAMP

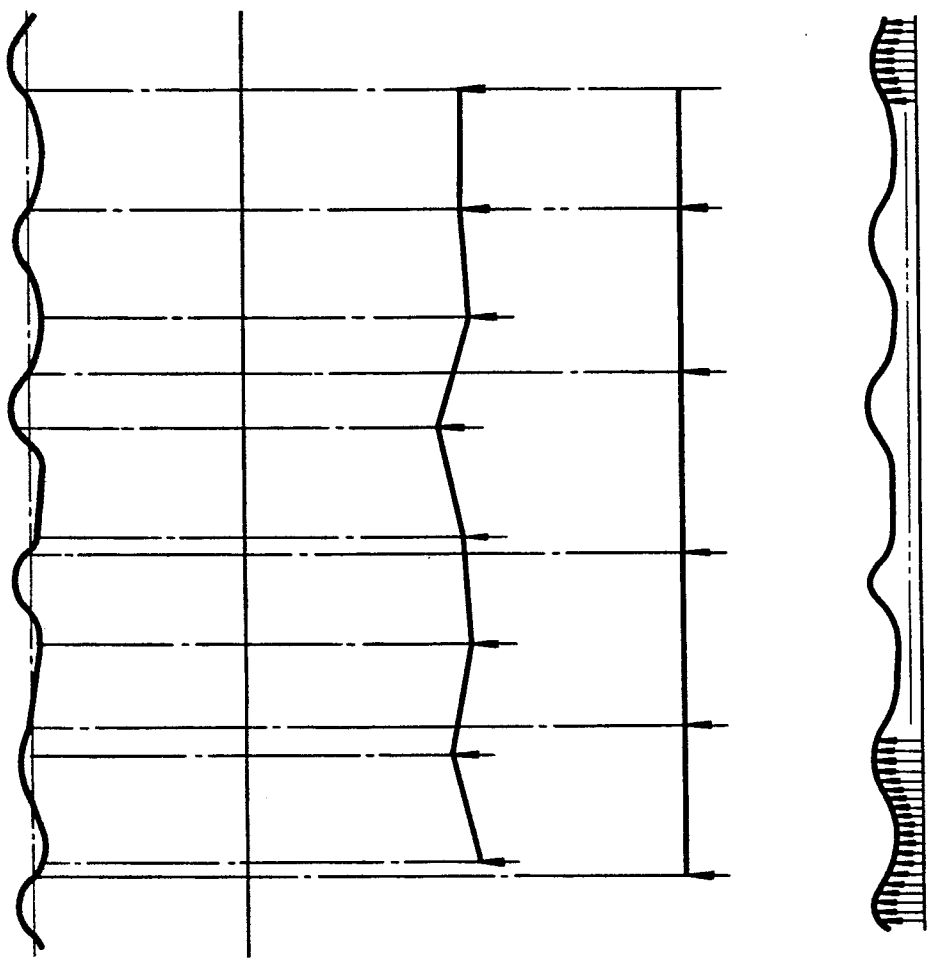

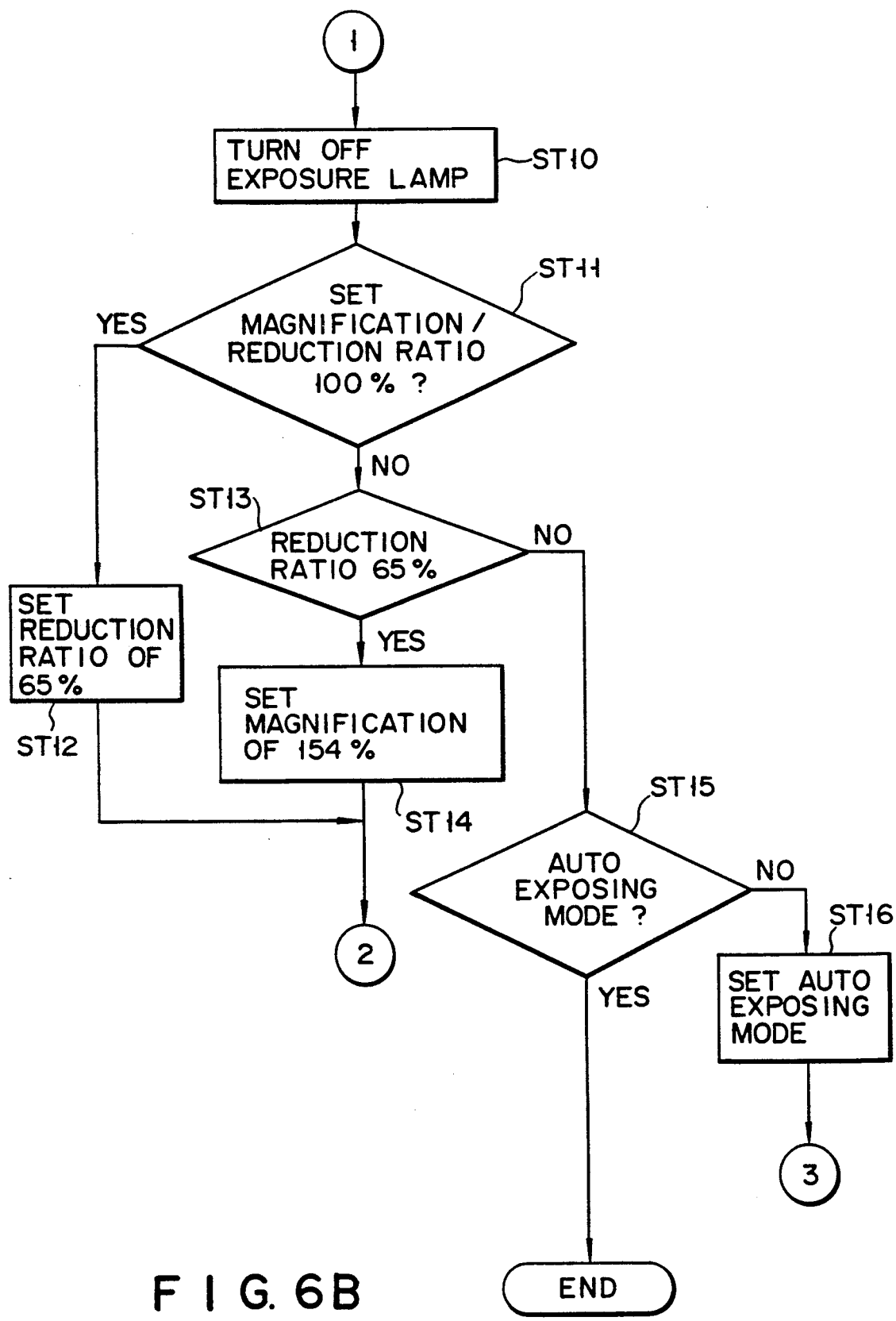
F I G. 6B

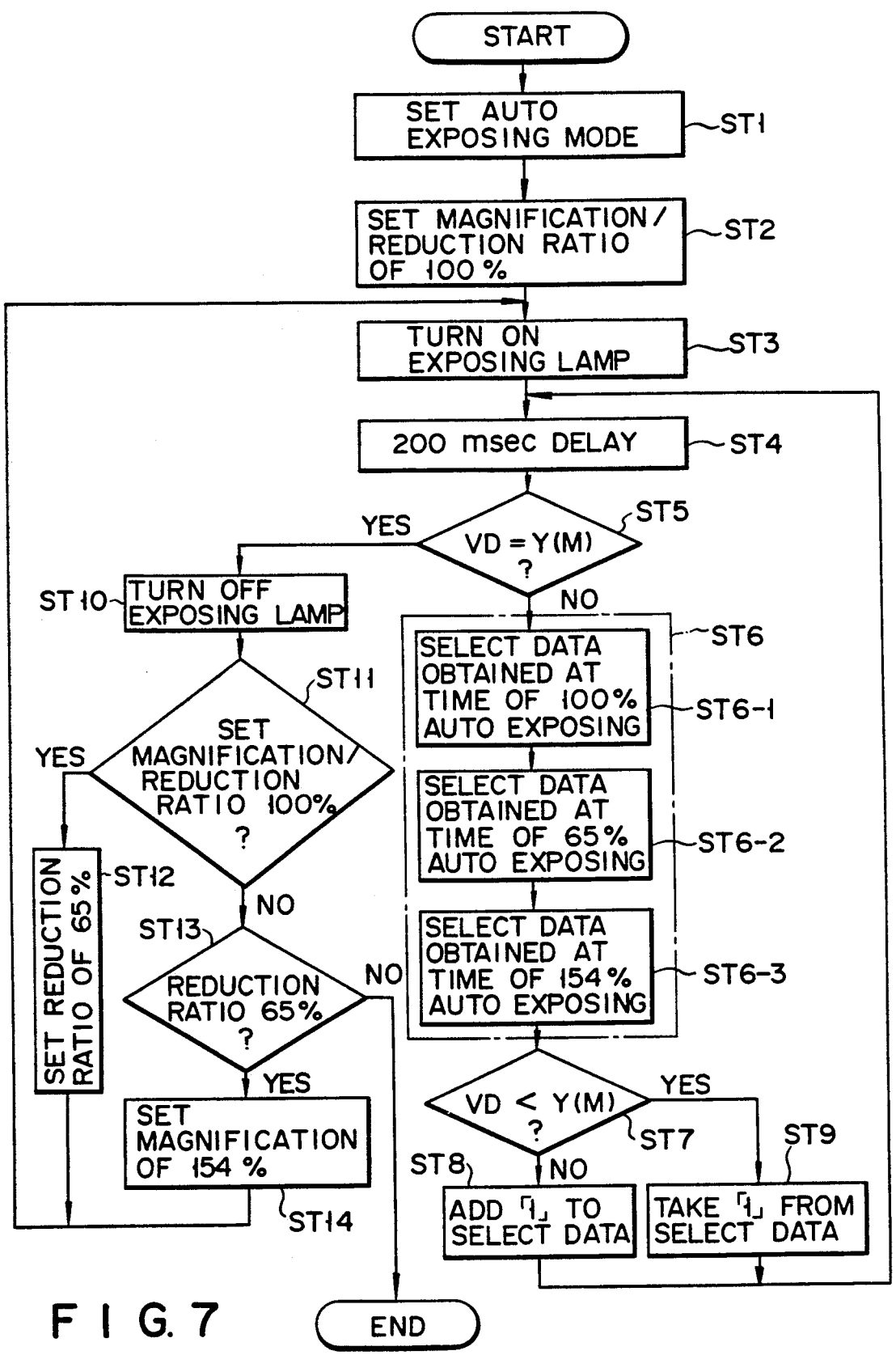
F I G. 7

LIGHT AMOUNT CONTROL APPARATUS

BACKGROUND OF THE INVENTION

1. Field of the Invention

The present invention relates to a light amount control apparatus for use with a copying machine or an image reader.

2. Description of the Related Art

As well known, an image forming apparatus, such as a copying machine, comes in three varieties, the apparatus with a manual exposure control function, the apparatus with an automatic exposure control function, and the apparatus with both the above functions. In the apparatus with the manual exposure control function, an exposure of an exposure lamp (an amount of light emitted from a light emitting component) is manually controlled. In the apparatus with the automatic exposure control function, the light amount is automatically controlled in accordance with an optical density on an original. Most of the exposure control system in the copying machine is based on the control that varies a lamp voltage applied to the lamp by an analog technology.

More specifically, for the exposure control, the copying machine with the manual exposure control function uses a variable resistor attendant with a manual operation by an operator or the combination of a voltage dividing resistor and a switching means. In the later case, the voltage divider provides a plurality of DC voltages, and the switching means such as a relay selects any of those DC voltages. A DC voltage that is thus set and corresponds to the lamp voltage applied to the exposure lamp is generated and applied to a lamp regulator (voltage stabilizing circuit), thereby providing a controlled exposure. In the copying machine with the automatic exposure control function, an amount of light reflected from an original is detected by a photo sensor such as a photo diode. An analog computing circuit subtracts the output voltage of the photo sensor from a reference voltage, thereby providing an exposure control voltage.

Recent market needs require additional functions for the copying machine, such as the zooming function of copy magnification (continuously changing of the magnification) and a twin color copying function (copying with two colors). This makes the analog control circuit complicated. Consequently, the number of controls to be operated by service men has been increased. An automatic exposure processing section is used for obtaining a fixed image density against an original of a certain density. The processor applies a linear approximation to the relationship of the lamp voltage and different magnifications for each of the differences between the magnifications and a reference magnification of 100%. An overall level adjusting section is also used for correcting the lamp voltage against variations in manually set copy conditions and sensitivity. The above two sections use digital attenuators. Variations in the exposure by the lamp and in the sensitivity of the photo sensor against a magnification as set are corrected by a central processing unit (CPU). When a color copy mode is set up or a magnification is changed, a peripheral speed of the drum changes, and an exposure also change. The exposure change must be corrected. The above processings and corrections increase the number of analog switches and controls for adjustments. Further, the circuitry becomes large in size and complicated, and hence the reliability of the copying machine incorporating such circuitry is degraded.

Therefore, in the exposure control circuit (light control apparatus), reduction of the circuit size and the improvement of reliability must urgently be attained. Reduction of the signal processing by the analog technology in the exposure control circuit would greatly improve reliability. The introduction of software technology using a CPU into the assembling and adjustment in the manufacturing stage would lead to improvement of the reliability, and reduction of labor.

The introduction of software technology into the exposure control has studied on the basis of the pre-estimation. Software controlled exposure control technique has almost completely developed, and many exposure control circuits have been marketed. A typical automatic exposure control circuit which is based on the combination of the digital technology and the analog technology is disclosed in U.S. Pat. No. 4,699,502. In this type of the control circuit, the technical development now progressing is to implement the entire exposure control into a complete digital circuit.

In the automatic exposure control, the lamp voltage applied to the exposure lamp must be varied in accordance with optical densities of originals, in real time. It is very difficult to technically realize this. For this reason, the exposure control system which allows the reduction of the analog control and is adaptable for the automatic exposure adjustment, has not yet been provided, so far as we know.

SUMMARY OF THE INVENTION

With the view of solving the above problems of the prior art, it is an object of the present invention to provide a light amount control apparatus which allows a software control to be introduced into the exposure control and hence requires less analog circuitry for exposure control.

Another object of the present invention is to provide a light amount control apparatus which allows data adjustment for the exposure control to be simplified and automatically carried out.

According to the present invention, there is provided a light amount control apparatus comprising: a light emitting component; a photo sensor for receiving light from the light emitting component; applying means for applying an AC voltage to the light emitting component; computing means for computing an electric power to be supplied to the light emitting component in accordance with magnifications and optical densities of originals by using the data signal outputted from the photo sensor; control means for control the electric power supplied to the light emitting component by using a value computed by the computing means; and operating means for causing the computing means to periodically perform the computation in synchronism with the AC voltage of the applying means applied to the light emitting element.

The light amount control apparatus thus arranged receives light from the light emitting component by the photo sensor, and controls an amount of light of the light emitting component in accordance with the output signal of the photo sensor. Specifically, electric power supplied to the light emitting component that is most favorable for the copy conditions and magnification as set, is computed by using the output data signal of the photo sensor which varies in accordance with an amount of light emitted from the light emitting component. The power supplied to the light emitting component is controlled by using the optimum power obtained. The supplied power is repeatedly computed during the light emission from the light emitting component.

Other objects, advantages and features of the present invention will be apparent from the following description taken in connection with the accompanying drawings, in which:

BRIEF DESCRIPTION OF THE DRAWINGS

FIGS. 3A through 3D are waveforms useful in explaining an exposure lamp control base on a phase angle control;

FIGS. 4A through 4E are waveforms comparatively showing the exposure controls by the present invention and the conventional apparatus;

FIGS. 6A and 6B cooperate to show a flowchart of an automatic adjustment program used in the manufacturing stage; and FIG. 7 shows a flowchart of an automatic adjustment program used in the maintenance stage.

DETAILED DESCRIPTION OF THE PREFERRED EMBODIMENTS

Preferred embodiments of a light amount control apparatus according to the present invention will be described with reference to the accompanying drawings.

Figure 1:
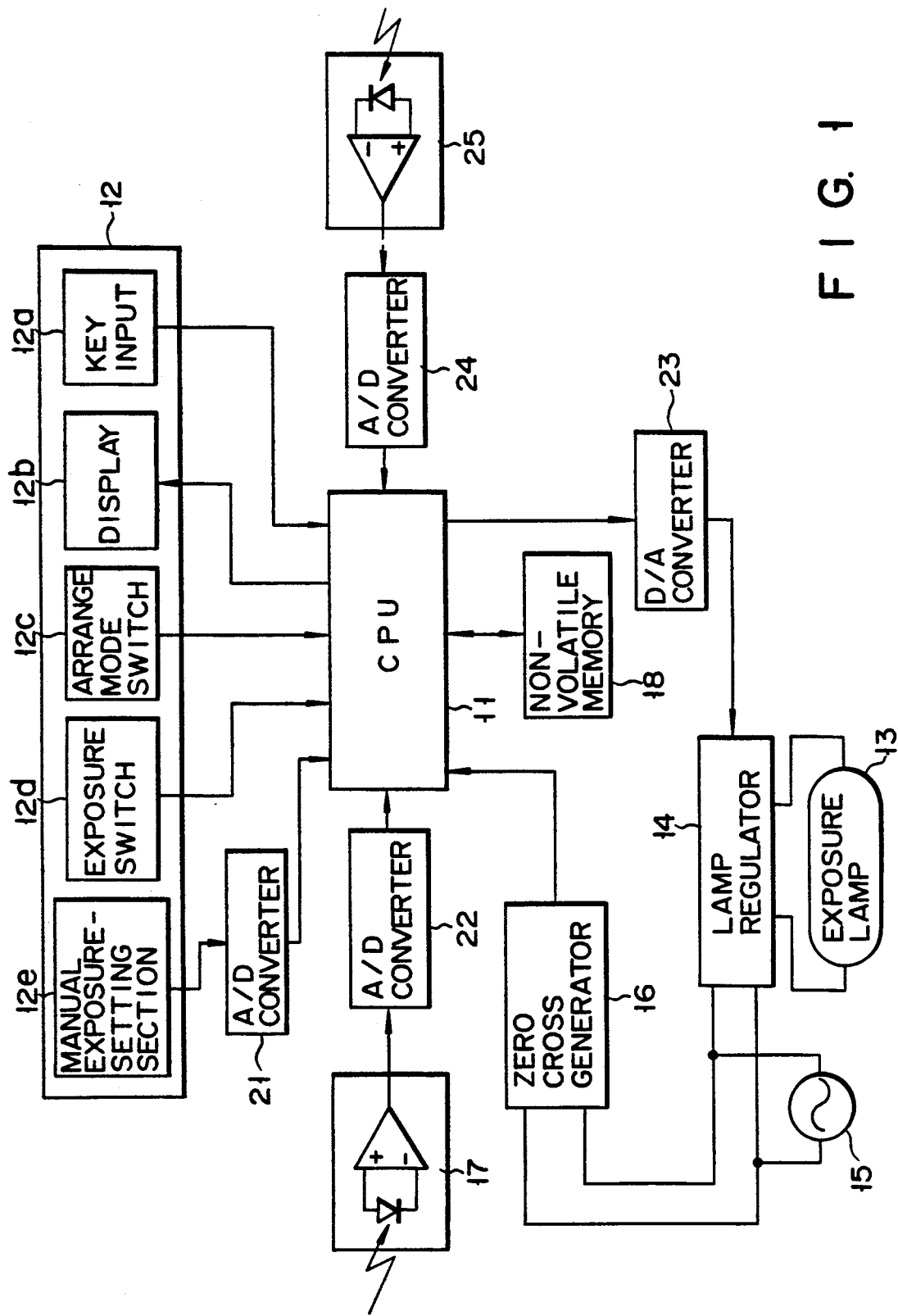
FIG. 1 is a block diagram showing an arrangement of a light amount control apparatus according to an embodiment the present invention.

Reference is first made to FIG. 1 showing a circuit arrangement of a light amount control apparatus for a copying machine, for example, which is a first embodiment of the present invention. In the figure, reference numeral 11 designates a central processing unit (CPU) as a computing means. The CPU 11 computes a voltage applied to an exposure lamp (supplied power) that depends on an exposure as is manually or automatically set. The CPU 11 is coupled with an operation panel 12 through which an operator enters copying conditions, and the like, a lamp regulator (control means) 14 for lighting an exposure lamp (light emitting component) through a phase angle control, a zero-cross generator 16 for generating a zero-cross point in an AC power source voltage that is supplied from an AC power source (applying means) 15 to the lamp regulator 14, a photo sensor (photo sensing element) that is constructed with a photo diode and senses an amount of light reflected from an original or document in an automatic exposure mode, an nonvolatile memory (memory means) 18 for storing the data used in the computation by the CPU 11, and the like.

The operation panel 12, through which an operator or a serviceman accesses the copying machine, is provided with a key entry section 12a including ten keys, magnification setting keys, a display section 12b for providing a visual presentation of the number of copies, magnification and the like, an adjustment mode switch 12c operated by a serviceman when he adjusts the data for the CPU computation, an exposure mode select switch 12d for selecting either of exposure modes, a manual expose mode, an automatic exposure mode, and a manual exposure setting section 12e operated by an operator in the manual exposure mode. When section 12e is operated, a signal, as set by a slide variable resistor, for example, is applied through A/D converter 21 to CPU 11.

When the automatic exposure mode is set up by the exposure select switch 12d, an output signal of the photo sensor 17 is supplied through another A/D converter 22 to the CPU 11.

In the automatic exposure mode, the CPU 11 receives an output signal of the photo sensor 17, viz., an analog voltage dependent on a light reflected from an original, after it passes through the A/D converter 22. By using digital data from the A/D converter 22, the CPU 11 computes a lamp voltage (supplied power) to automatically optimize a voltage (power) applied to the lamp 13 in accordance with an optical density of an original and copy conditions, and the like. In the manual exposure mode, the CPU 11 fetches a set position in the manual exposure setting section 12e in the form of digital data that is derived from the A/D converter, and computes a lamp voltage based on the set value. The CPU 11 supplies the lamp voltage thus obtained to the lamp regulator 14 via a D/A converter 23.

The zero cross circuit 16 determines the timings of a sampling carried out when the CPU 11 receives the output signal of the photo detector 17.

The nonvolatile memory 18 is for storing the data used for the computation by the CPU 11. The computation data contains the data to obtain an optimum exposure for an original of a reference optical density at the magnification of 100% by correcting variations in a drum sensitivity and in the characteristics of an optical system, that are prepared for the different magnifications, the automatic exposure mode and the manual exposure mode.

In the assembling stage, a process adjusting tool 25 is coupled through an A/D converter 24 to the CPU 11. An exposure by the lamp 13 on the drum surface is fetched in the form of digital data, and the data in the nonvolatile memory 18 is automatically adjusted so that an output signal of the tool 25 has a reference value preset in design stage at each magnification. Through the operation of the adjustment mode switch 12c by a serviceman, the data in the nonvolatile memory 18 is automatically adjusted so that the internal data VD in the CPU 11 that is computed by using the output data signal of the photo sensor 17 is equal to a preset reference value Y(M) at each magnification.

Figures 2A, 2B:
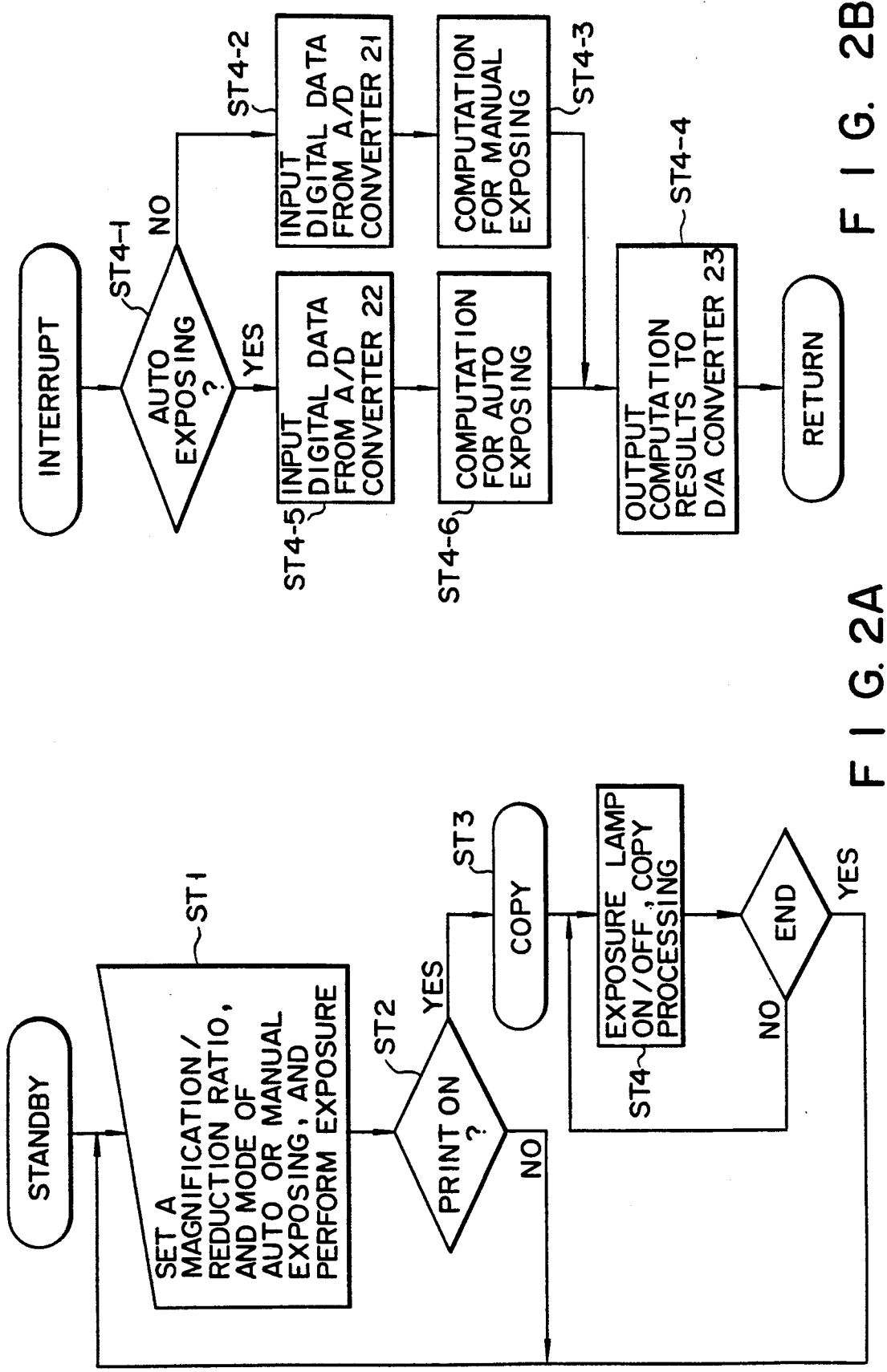
FIGS. 2A and 2B are flowcharts useful in explaining the operation of the light amount control apparatus of FIG. 1.

The operation of the light amount control apparatus thus arranged will be described with reference to FIGS. 2A and 2B.

To start, in Step S1 as a preparatory step for copy or print, an operator enters desired preparatory parameters such as magnification, exposure, and automatic or manual exposure mode. In this instance, the manual exposure mode is set up by operating the exposure mode select switch 12d on the operation panel 12. An original is set on a document table (not shown) of the copying machine. In Step 2, a start key (not shown) is operated. In Step 3, the copy or print operation starts. In Step 4, the exposure lamp 13 is lit on and off, and a copy processing is executed. More exactly, in Step 4, the program of the FIG. 2A is interrupted and a program shown in FIG. 2B is executed. In Step 4–1 of the program of FIG. 2B, the CPU 11 decides if the exposure mode is the manual exposure mode, and in Step 4-2 fetches the set position in the manual exposure mode setting section in the form of digital data through the A/D converter 21. In Step 4-3, the CPU 11 computes a lamp voltage to optimize an exposure in accordance with the data and the copy conditions. Note that in this instance, the lamp voltage, which by convention is obtained by an analog control circuit, is obtained through the computation by the CPU 11. In Step 4-4, the lamp voltage thus computed is outputted through the D/A converter 23 to the lamp regulator 14. The lamp regulator 14 applies the lamp voltage that is computed by the CPU 11 to the exposure lamp 13. Consequently, the lamp 13 emits a light amount dependent on the set position in the manual exposure mode setting section 12e.

Let us consider another case that the operator operates the exposure select switch 12d on the operation panel 12 and the copying machine is placed in the automatic exposure mode, an original is placed on the document table, the start key is depressed, and the copying operation starts (Steps 1 to 3).

The CPU 11 enters the processing in Step 4, and branches to the program indicated by (B) in FIG. 2. In Step 4-1 of this program, the CPU 11 decides that the automatic exposure mode has be set up, and goes to Step 4-1. In this step, the CPU 11 fetches the output data signal of the photo sensor 17 in the form of digital data, through the A/D converter 22. In the next Step S4-6, the CPU 11 computes a lamp voltage providing an optimum exposure on the basis of the digital data and the copy magnification as entered in Step 1. In this way, the lamp voltage is digitally computed by the CPU 11. The result of computation or the lamp voltage thus obtained is outputted through the D/A converter 23 to the lamp regulator 14. The lamp regulator 14 then applies to the lamp 13 a voltage the lamp voltage from the CPU 11. In this way, the lamp 13 emits an amount of light that depends on the output data signal of the photo sensor 17, viz., the amount of light reflected from the original.

Where the lighting of the lamp 13 is controlled by using the lamp regulator 14, a phase angle control with respect to the AC power waveform is employed for lighting on the lamp 13, as shown in FIG. 3. As shown, an actual optical output (FIG. 3D, solid line) of the lamp 13 contains an average optical output (FIG. 3D, one dot chain line), components of frequencies including a double frequency of that of the AC power, and ripple components arising from the filter effects by the thermal time constant of the lamp 13. Let us consider the following case. The lamp operating with a fixed lamp voltage illuminates an original of a uniform density (FIG. 4A). The output data signal of the photo sensor 17 is sampled at the timing that is selected not allowing for the ripple components (FIG. 4C). The data thus sampled is used for the automatic exposure control. In this case, the fetched data contains data error as a beat of the sampling frequency and the ripple components of the optical output. The data error inevitably leads to an error in the results of computation by the CPU 11. This appears as a flicker of the lamp 13.

To cope with this ripple problem, the instant invention uses the zero-cross generator 16 and samples the optical output signal in synchronism with the AC power frequency. As shown in FIG. 4D, the output signal of the photo sensor 17 is sampled in synchronism with the AC power frequency. The data signal thus sampled is used for the automatic exposure control. The resultant output signal (digital data) depends on only the density of the original, not the ripple components. Consequently, the automatic exposure control is stable and free from flicker.

As seen from the foregoing description, in an exposure control apparatus of the type in which a light from the exposure lamp is received by the photo sensor, and a light exposure of the exposure lamp is controlled in accordance with the output signal of the photo sensor, a lamp voltage applied to the lamp that reflects the copy conditions is obtained by using the output data signal of the photo sensor that also reflects the amount of light from the lamp. The lamp voltage is controlled in accordance with the obtained voltage. During the course of the illumination by the exposure lamp, the lamp voltage is repeatedly obtained. In this way, a perfect digital processing of the exposure control including the automatic exposure control is realized.

Thus, the output data signal of the photo sensor that depends on an amount of light reflected from an original when it is illuminated by the exposure lamp is digitized. The resultant digital data is fetched into the CPU in synchronism with a AC power clock. By using the digital data, the CPU calculates the lamp voltage providing an optimum exposure for the copy conditions. Accordingly, the data signal (digital data) dependent only on the original density, not on the ripple components can be used for the digital calculation. As a result, the control in the automatic exposure mode can be carried out stably and precisely. Thus, the automatic exposure control can be carried out with the aid of a software, and can be perfectly realized by the digital technology. This implies that the analog control section is reduced in size, and simplified, and an improved reliability of the related circuitry is secured.

Figure 5:
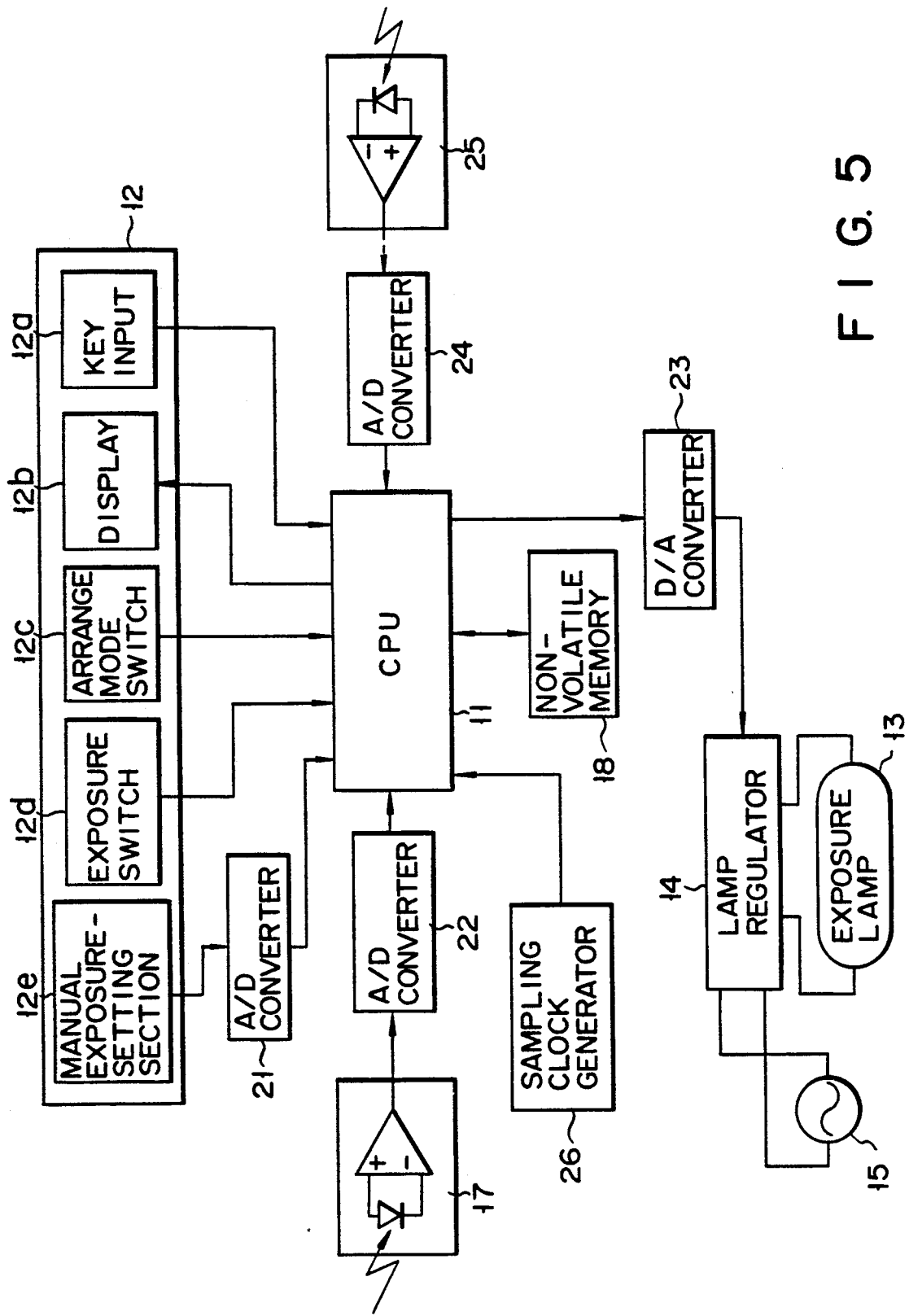
FIG. 5 is a block diagram showing an arrangement of a light amount control apparatus according to another embodiment of the present invention.

In the above-mentioned embodiment, the output data signal (digital data) of the photo sensor is fetched by the CPU in synchronism with the AC power clock signal. Alternatively, the output data signal of the photo sensor may be sampled at a much higher frequency than the frequencies of the ripple components. This may be implemented as shown in FIG. 5. In this instance, a sampling clock generator 26 exclusively for generating sampling clock signal of such a higher frequency (FIG. 4E). This instance allows the exposure control including the automatic exposure to be implemented by a software. The sampling teaches that the control performance obtained by this approach is comparable with that based on the analog calculation.

In the above-mentioned embodiment, the lamp voltage to the exposure lamp is varied by applying the computation results through the D/A converter to the lamp regulator. Alternatively, the CPU per se computes a necessary phase controlled signal and directly controls the lamp voltage by the phase control signal.

The description to follow is a means for adjusting the data (data to be adjusted) stored in the memory 18, which is used for correcting variations in the drum sensitivity and in the optical system of the above-mentioned exposure control apparatus.

Figure 6A:
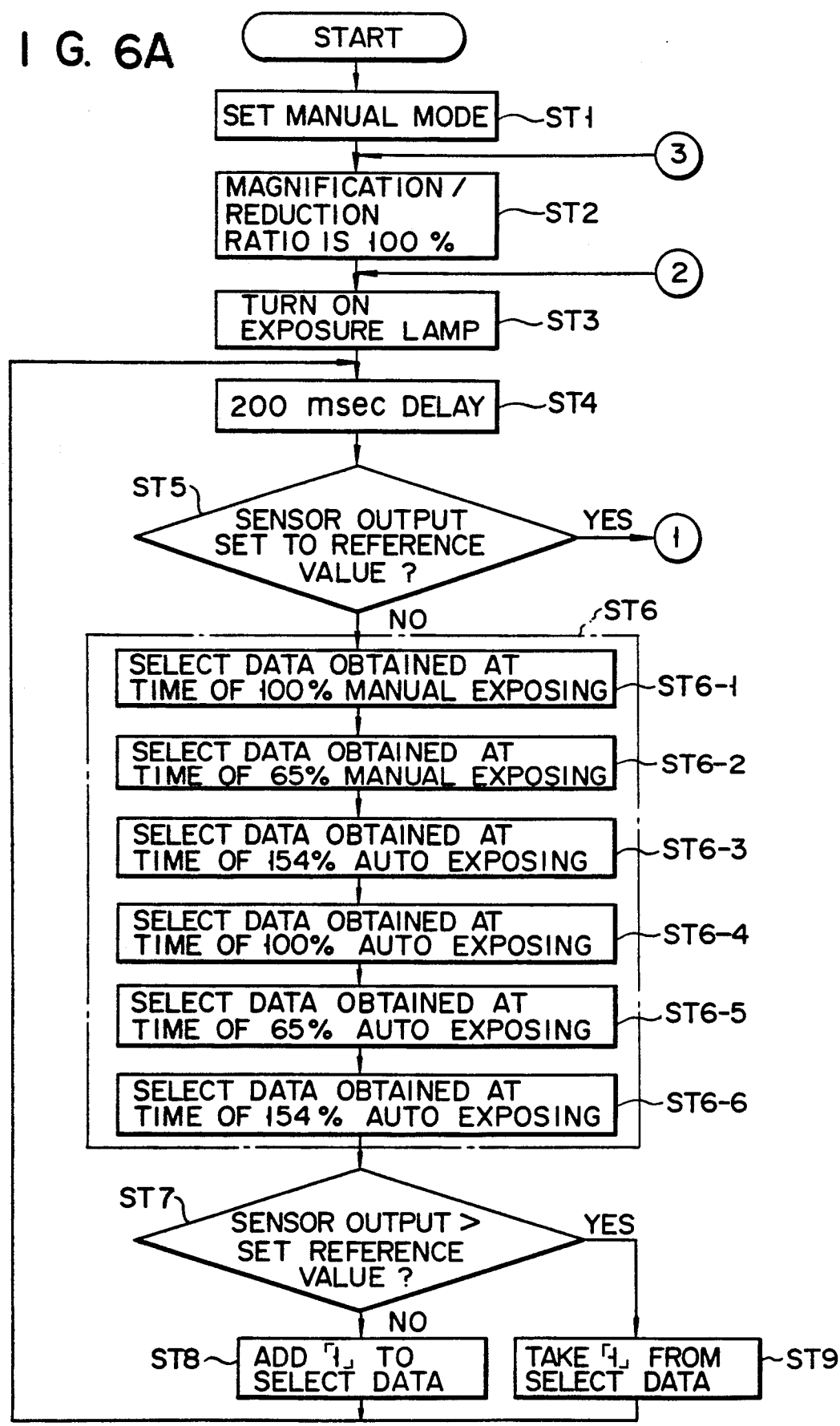

FIGS. 6A and 6B cooperate to show a flowchart of a program applied to the copying machine. This program is used, in a condition that in place of the drum, the process adjusting tool 25 is connected to the light amount control apparatus. The tool 25 is connected to the light amount control apparatus, and the adjustment mode control switch 12c is operated on the operation panel 12. In Step ST1, the manual exposure mode is set up, and in Step ST2, a magnification is set at 100%. In Step ST3, the exposure lamp 13 is lit on. After its operation settles down (Step ST4), the CPU 11 fetches the output signal of the tool 25 through the A/D converter 24. In Step ST5, the CPU 11 compares the sensor output data of the tool 25 with a preset reference value.

If the answer is NO, the CPU 11 goes to Step ST6. In this step, the CPU accesses to a storage location of the nonvolatile memory 18 which stores the adjusted data providing an optimum exposure when an original of a reference density is illuminated at the 100%-magnification and in the manual exposure mode (Step ST6-1). If the CPU 11 decides that the sensor output data is smaller than the present reference value (Step ST7), the address data is incremented by one (+1) (Step ST8). If the former is larger than the latter (Step ST7), the address data is decremented by one (−1) (Step ST9).

When the sequences of Steps ST4 to ST8 and ST9 are repeated, and the sensor output data of the tool 25 becomes equal to the reference value, the exposure lamp 13 is lit off (Step ST10 in FIG. 6B). Also when the CPU 11 decides that sensor output is equal to the reference value, the lamp 13 is lit off. In this way, the adjustment of the data stored in the memory 18 at the 100%-magnification in the manual exposure mode is automatically carried out to make the sensor output of the tool 25, that is at an exposure point on the drum circumference, equal to the preset reference value at that magnification. Succeeding to the data adjustment at the 100%-magnification, the data adjustment is carried out at the 65%-magnification as a minimum magnification (Step ST6-2) and the 154%-magnification (Step ST6-3) as a maximum magnification in this order (Steps ST4 to ST14). After the data adjustments at the respective magnifications in the manual exposure mode end (Step ST15), the automatic exposure mode is set up (Step ST16).

Also in the automatic exposure mode, the adjustment of the data stored in the memory 18 is automatically carried out to make the sensor outputs of the tool 25, that is at an exposure point on the drum circumference, equal to the preset reference values, at the 100%-magnification (Step ST6-4), 65%-magnification (Step ST6-5), and 154%-magnification (Step ST6-6).

Turning now to FIG. 7, there is shown a flowchart of another automatic adjustment program used by service men. This program provides a convenient data adjustment in places where the tool 25 cannot be used in place of the drum, for example, a customer's office where the copying machine is installed. Before the program is operated, a service man adjusts the data (calculation data) in the memory 18 for the magnifications of 100%, 65% and 154% in the manual mode, through the operation panel 12, while comparing the images of copies to an original image of a reference density. The data for the magnifications of 100%, 65% and 154% in the manual mode, that are stored in the memory 18, are first adjusted so as to provide optimum exposures at these magnifications. Then, the adjustment mode switch 12c is operated on the operation panel 12, to set up the automatic exposure mode (Step ST1). The magnification is set at 100% (Step ST2).

Then, the exposure lamp 13 lights on (Step ST3). After the lamp settles down in operation (Step ST4), the output data of the photo sensor 17 is applied to the CPU 11 through the A/D converter 22. The internal data VD of the CPU 11 that results from a calculation using the output data of the photo sensor 17 is compared with a reference value Y(M) preset in design stage (Step ST5).

If the answer is NO, that is, VD ≠ Y(M), the CPU 11 goes to Step ST6. In this step, the CPU accesses to a storage location of the nonvolatile memory 18 which stores the data providing an optimum exposure when an original of a reference density is illuminated at the 100%-magnification and in the automatic exposure mode (Step ST6-1). If the CPU 11 decides that the internal data VD is larger than the reference value Y(M) (Step ST7), the address data is incremented by one (+1) (Step ST8). If the former is smaller than the latter (Step ST7), the address data is decremented by one (−1) (Step ST9).

When the sequences of Steps ST4 to ST8 and ST9 are repeated, and the internal data VD at the 100% magnification in the automatic exposure mode becomes equal to the reference value Y(M), the exposure lamp 13 is lit off (Step ST10). Also when the CPU 11 decides that internal data VD is equal to the reference value Y(M), the lamp 13 is lit off. In this way, the adjustment of the data stored in the memory 18 at the 100%-magnification in the automatic exposure mode is automatically carried out to make the internal data VD, that is computed on the digital data dependent on the photo sensor 17, equal to the reference value Y(M) at that magnification. Succeeding to the data adjustment at the 100%-magnification, the data adjustment is carried out at the 65%-magnification (Step ST6-2) as a minimum magnification and the 154%-magnification (Step ST6-3) as a maximum magnification in this order (Steps ST4 to ST14).

In this way, the data used in the computation to obtain a lamp voltage to the exposure lamp is stored, and the stored data can be adjusted.

In the manufacturing stage, the data stored in the nonvolatile memory may be automatically adjusted at the respective magnifications of 100%, 65% and 154% in both the manual exposure mode and in the automatic exposure mode. Also in the maintenance stage by servicemen, the stored data may be automatically adjusted at the respective magnifications of 100%, 65% and 154% in the automatic exposure mode. Accordingly, when the copy conditions are changed, the data for the computation by CPU can be automatically and optimally changed, by the self-control function of the CPU per se. This provides simple and automatic adjustment work in the manufacturing and maintenance stages. The simple and automatic adjustment work leads to reduction of labor and elimination of nonuniform adjustment.

While the program is operated by operating the adjustment mode switch in the above-mentioned embodiments, it may be started up by entering a related code by means of ten keys. It is evident that the present invention is applicable not only for the exposure control apparatus of a copying machine, but also for other apparatuses, for example, an image reader.

What is claimed is:
1. A light amount control apparatus comprising:
   a light emitting component;
   a photo sensor for receiving light from said light emitting component;
   applying means for applying an AC voltage to said light emitting component;
   computing means for computing an electric power to be supplied to said light emitting component in accordance with magnifications and optical densi- ties of originals by using the data signal outputted from said photo sensor;

control means for controlling electric power supplied to said light emitting component by using a value computed by said computing means; and operating means for causing said computing means to periodically perform said computation at a frequency at least two times that of the AC voltage of said applying means applied to said light emitting element, and in synchronism with the AC voltage of said applying means.

2. An image forming apparatus comprising:

exposing means for exposing an original;

detecting means for detecting the image density of the original;

voltage applying means for applying an AC voltage to said exposing means;

computing means for computing the amount of the electric power to be supplied to said exposing means, in accordance with the magnification and image density of said original, by using data signal outputted from said detecting means;

control means for controlling the amount of the electric power supplied to said exposing means by using a value computer by said computing means; and operating means for causing said computing means to periodically perform computations at a frequency at least two times that of the AC voltage of said voltage applying means, applied to said exposing means in synchronism with the AC voltage of said voltage applying means.

* * * * *